United States Patent [19]
Kirk

[11] Patent Number: 5,075,403
[45] Date of Patent: Dec. 24, 1991

[54] AMINO/POLYOXYALKYLENATED POLYDIOGANOSILOXANES

[75] Inventor: James R. Kirk, Ecosse, United Kingdom

[73] Assignee: Rhone-Poulenc Chimie, Courbevoie, France

[21] Appl. No.: 542,120

[22] Filed: Jun. 22, 1990

[30] Foreign Application Priority Data

Jun. 22, 1989 [FR] France ................................ 89/08581

[51] Int. Cl.$^5$ .............................................. C08G 77/06
[52] U.S. Cl. ........................................ 528/15; 528/25; 528/29; 528/31; 556/479; 556/424; 556/425; 556/423
[58] Field of Search ............... 556/479, 424, 425, 423; 528/29, 25, 31, 15

[56] References Cited

U.S. PATENT DOCUMENTS

| | | | |
|---|---|---|---|
| 3,661,964 | 5/1972 | Griffiths et al. | 528/29 |
| 4,036,868 | 7/1977 | Atherton | 556/423 |
| 4,184,004 | 1/1980 | Pines et al. | 428/447 |
| 4,409,267 | 10/1983 | Ichinohe et al. | 427/387 |
| 4,727,168 | 2/1988 | Yoshino et al. | 556/413 |
| 4,892,918 | 1/1990 | Ryang | 528/15 |

FOREIGN PATENT DOCUMENTS

| | | |
|---|---|---|
| 0058493 | 8/1982 | European Pat. Off. |
| 0078597 | 5/1983 | European Pat. Off. |
| 0306007 | 3/1989 | European Pat. Off. |
| 1409742 | 10/1975 | United Kingdom |
| 2201433 | 9/1988 | United Kingdom |

OTHER PUBLICATIONS

Silicones (1989), Hardman and Tonkelson, p. 207 (vol. 5).
Inoue et al., "Polyoxyalkene-siloxane copolymers", *Chemical Abstracts*, vol. 83, No. 8, Abstract No. 59945d (Aug. 25, 1975), p. 51.
Isobe, "Organopolysiloxane copolymers containing polyoxyalkylene-amino radicals", vol. 88, No. 6, Abstract No. 39010v (Feb. 6, 1988), p. 63.
Chemical Abstracts, vol. 83, No. 8, 25, Aug. 1975, p. 51, resume No. 59945d, Columbus, Ohio, U.S.; & JPA 49,040,398 (SHIN-ETSU Chemical Industry Co., Ltd) 15-04-1974.
Chemical Abstracts, vol. 88, No. 6, Feb. 6, 1978, p. 63, resume No. 39010v, Columbus, Ohio, U.S.; & JPA 77,103,498 (SHIN-ETSU Chemical Industry Co., Ltd.) 30-08-77.

*Primary Examiner*—Melvyn I. Marquis
*Assistant Examiner*—Margaret W. Glass
*Attorney, Agent, or Firm*—Burns, Doane, Swecker & Mathis

[57] ABSTRACT

Novel organofunctional polydiorganosiloxanes containing amino and polyoxyalkylene groups, well adapted as surfactants, dispersants or additives to textile rinsing softening compositions, or to solid antifoams for washing powders, have the formula:

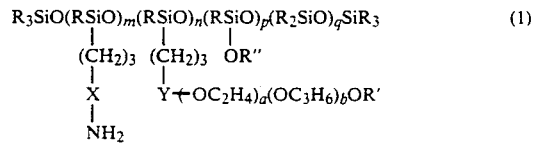

(1)

5 Claims, No Drawings

AMINO/POLYOXYALKYLENATED POLYDIOGANOSILOXANES

BACKGROUND OF THE INVENTION

1. Field of the Invention

The present invention relates to novel organofunctional polydiorganosiloxanes comprising amino and polyoxyalkylene groups, to a process for preparing such novel polydiorganosiloxanes, and to the end uses thereof.

2. Description of the Prior Art

A wide variety of polydiorganosiloxanes containing an amino group or a polyoxyalkylene group are described in the literature, as are the end applications/uses thereof, in particular, their use in detergent compositions, antifoams, polyurethane foam additives, glazing compositions (polishes), and the like.

GB-A-1,409,741 and GB-A-1,409,742 describe the synthesis of amino-functional polydiorganosiloxanes containing alkoxy groups. These polymers are prepared by the partial reaction of allylamine with a polydiorganosiloxane bearing a $\equiv$SiH hydride group in the presence of a platinum-based catalyst. The residual $\equiv$SiH groups are then reacted with an alcohol, for example, isopropanol. These materials are used as additives for detergent-resistant glazing compositions.

U S. Pat. No. 4,184,004 describes a polydiorganosiloxane containing an epoxy group and a polyoxyalkylene group and its use as a textile softener.

GB-A-2,201,433 describes the use of a polydiorganosiloxane containing an ammonium group and a polyoxyalkylene group as an additive to a detergent or rinsing composition.

EP-A-58,493 relates to the use of a combination of three functional polydiorganosiloxanes (A), (B) and (C) for the treatment of textile fibers, (A) containing both amino groups and polyoxyalkylene groups. Although the definition of (A) is extremely broad, EP-A-58,493 specifically describes only one particular oil (A) of the formula:

$$Me(Me_2SiO)_{130}(MeFSiO)_3(MeGSiO)_{10}SiMe_3$$

where
$F = -(Ch_2)_3-NH(CH_2)_2NH_2$
$G = -(CH_2)_3O(C_2H_4O)_{10}H$.

SUMMARY OF THE INVENTION

A major object of the present invention is the provision of improved polydiorganosiloxanes comprising amino and polyoxyalkylene groups that are easily produced.

Another object of the present invention is the provision of novel polydiorganosiloxanes of the above type that are stable in an aqueous medium, are hydrophilic in nature, are readily emulsified or microemulsified, and which can, in certain cases, be water-soluble or dispersible in aqueous media.

Still another object of this invention is the provision of novel polydiorganosiloxanes of the above type which are useful as surfactants and additives in detergent compositions, especially in rinsing compositions for linens, and also additives for silicone antifoam compositions.

Briefly, the present invention features novel polydiorganosiloxanes comprising amino and polyoxyalkylene groups and having the average formula (1):

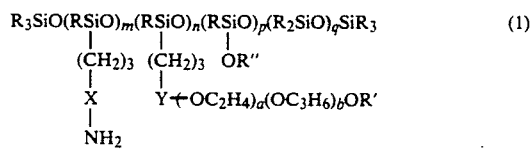

which the radicals R are each a $C_1-C_4$ alkyl, phenyl or 3,3,3-trifluoropropyl radical, at least 80% of the number of radicals R being methyl radicals; X is a single covalent bond or a divalent radical of the formula (2):

$$-O-CH_2-CH(OH)-CH_2-NH-W- \quad (2);$$

Y is a single covalent bond or a divalent radical of the formula (3):

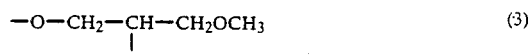

with the proviso that, if p=O and X is a covalent bond, Y is a radical of formula (3); m is a number ranging from 1 to 25, and preferably from 1 to 10; n is a number ranging from 1 to 25, and preferably from 1 to 10; p is a number ranging from 0 to 15, and preferably from 1 to 5; g is a number ranging from 5 to 500, and preferably from 10 to 400; a is a number ranging from 0 to 150; b is a number ranging from 0 to 150; a+b ranges from 5 to 200; W is a divalent hydrocarbon radical having from 1 to 6 carbon atoms, such as $-CH_2$, $-(CH_2)_2-$, $+CH_2)_3$, $+CH_2)_6$, $-CH_2-$, $+CH_2)_2$, $+CH_2)_3$, $+CH_2)_6$,

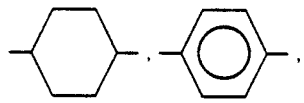

with $-(CH_2)_2$ being the preferred radical; R' is a hydrogen atom, a $C_1-C_6$ alkyl radical, a $C_1-C_6$ acyl radical or a phenyl radical, with R' preferably being a methyl radical, like the radical R; and R'' is a linear or branched $C_1-C_6$ alkyl radical, preferably isopropyl and isobutyl.

DETAILED DESCRIPTION OF THE PREFERRED EMBODIMENTS OF THE INVENTION

More particularly according to the present invention, by varying the ratio a/b and the sum a+b, the hydrophilic nature and hydrophobic nature of the polymers of formula (1) can be readily modified.

In the case where X is a covalent bond and Y a divalent radical of formula (3), the polymers of formula (1) may be advantageously prepared in the following manner:

The starting material is a hydropolydiorganosiloxane of the formula:

$$R_3SiO(RHSiO)_c(R_2SiO)_qSiR_3 \quad (4)$$

in which R and g are as defined above and $c=m+n+p$.

In a first step, the SiH groups of the polymer (4) are partially hydrosilylated by adding a suitable amount of allylamine in the presence of a hydrosilylation catalyst, preferably a platinum-based catalyst.

The platinum-based catalysts suitable for carrying out the hydrosilylation reaction of the polymers of formula (4) are extensively described in the literature; particularly exemplary are the complexes of platinum with an organic material described in U.S. Pat. Nos. 3,159,601, 3,159,602 and 3,220,972 and in European Patents A-57,459, A-188,978 and A-190,530, and the complexes of platinum with vinyl organopolysiloxane described in U.S. Pat. Nos. 3,419,593, 3,377,432 and 3,814,730.

To react the polymer of formula (4) with allylamine, an amount of platinum-based catalyst, calculated in terms of the weight of platinum metal, ranging from 5 to 600 ppm, and preferably from 10 to 200 ppm, based on the weight of SiH-containing polymer of formula (4), is typically employed.

The hydrosilylation reaction can be carried out in bulk, or in a volatile organic solvent such as toluene, heptane, xylene, tetrahydrofuran, tetrachloroethylene and white spirits.

It is generally desirable to heat the reaction mixture to a temperature ranging from 30 to 200° C. for the time required for the reaction to proceed to completion. Moreover, it is desirable to add the allylamine dropwise to the polymer of formula (4) dissolved in an organic solvent, and preferably at the reflux temperature of the solvent.

The solvent is then optionally removed, for example by distillation under reduced pressure. However, the resulting polymer solution may be directly used for the second step of the process.

The polymer obtained corresponds to the formula:

$$R_2SiO(RSiO)_m(RHSiO)_d(R_2SiO)_qSiR_3 \quad (5)$$
$$\underset{NH_2}{\underset{|}{\underset{(CH_2)_3}{|}}}$$

wherein R, m and q are as defined above and d=n+p.

The polymer of formula (5) can include, by way of impurities, a small amount of structural units of the formulae:

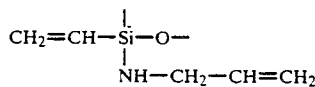

and

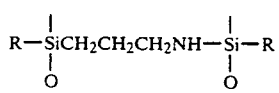

In a second step, all or part of the residual ≡SiH groups of the polymer of formula (5) are hydrosilylated with an unsaturated polyoxyalkylene of the formula:

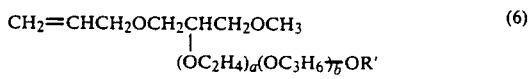

wherein a, b and R' are as defined above.

This second step is similar to the first step. It is preferable to conduct the operation in an organic solvent medium, preferably the same as that used in the first step, and the starting material is then the solution of the polymer (5) obtained at the end of the first step. It is then not necessary to add a platinum-based catalyst, which is already present in such solution.

The solvent is removed, for example, by distillation under reduced pressure. The polymer obtained may be purified, for example, by passing same through an absorbent silica column.

If this polymer does not contain residual ≡SiH groups, it corresponds to the formula (1) in which p=0. If this polymer contains residual ≡SiH groups, they are reacted with an alcohol of formula R"OH, with R" being as defined above, in the presence of a catalyst such as diethylhydroxylamine, according to British Patents A-1,409,741 and A-1,409,742 noted above.

Of course, the units of the formulae:

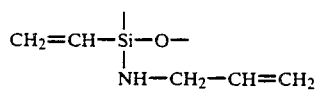

and

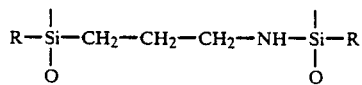

may persist, by way of impurities, in the polymer of formula (1).

These units may be blocked by reaction with an alcohol of formula R"OH, giving units of the formulae:

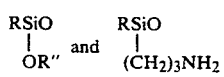

To prepare the polymers of formula (1) in which X is a radical of formula (2), the starting material is a polymer of formula (4) as defined above, on which, during a first step, a partial hydrosilylation is carried out by means of an unsaturated polyoxyalkylene of the formula:

$$CH_2=CHCH_2Y+OC_2H_4)_a(OC_3H_6)_bOR' \quad (7)$$

in which Y, a, b and R' are as defined above, to obtain the polymer of the formula:

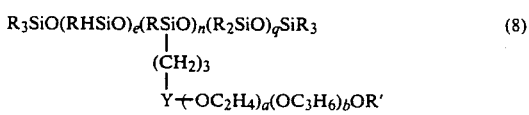

in which R, R', Y, n, g, a and b are as defined above and e=m+p.

In a second step, the polymer of formula (8) is completely hydrosilylated with allyl glycidyl ether of the formula:

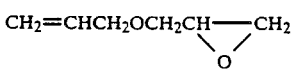

The polymer obtained, which may be prepared according to U.S. Pat. No. 4,184,004 noted above, is optionally reacted with an alcohol R"OH in the case where residual ≡SiH groups remain. The polymer is then reacted with a molar excess of a diamine of formula $H_2NWNH_2$, with W being as defined above, and the polymer of formula (1) is thereby obtained.

The polymer of formula (1) is substantially linear, being composed almost exclusively of units M: $(R_3SiO_{1/2})$ and D: $(R_2SiO)$.

However, up to 10 mol % of units T: $(RSiO_{3/2})$ may be present.

The polymer of formula (1) may be water-soluble, dispersible in water or insoluble in cold or hot water. In general, the water-solubility is increased by increasing the weight content of polyoxyalkylene groups in the polymer and varying the ratio a/b and the sum a+b.

The polymer of formula (1) can, hence, depending on the case, be used as is, dissolved in an organic solvent, in aqueous solution or dispersion, or in emulsion and microemulsion form.

The polymers according to the invention are especially useful for treating glass fibers and organic fibers (sizes), for textile treatment and softening, as surfactants, water-repellent agents, mold-release agents, lubricants, additives for organic polymers, especially PVC, lubricants for textile fibers, additives for detergent-resistant polishes and antifoam and defoaming agents.

The polymers of formula (1) are especially useful in bulk, or dissolved in an organic solvent, for treating textile fibers. They are then preferably used in combination with an $\alpha,\omega$-(dihydroxy)polydiorganosiloxane oil having a viscosity ranging from 100 to 150,000 mPa.s at 25° C., in which the organic radical is preferably methyl, optionally in the presence of a condensation catalyst such as a tin salt.

From 10 to 1,000 parts of hydroxylated oil are then used per 100 parts of polymer (1).

The polymers according to the invention are more especially useful, on the one hand as dispersants in solid antifoams for washing powders, and, on the other, as a silicone additive in textile rinsing compositions, optionally in combination with an organic and preferably a cationic surfactant.

The solid antifoam for washing powder contains:
(i) 100 parts of a matrix selected from among polyethylene glycol, a polyoxyethylene/polyoxypropylene copolymer, a solid surfactant such as sorbitan mono- or tristearate and a solid wax, as well as the various possible mixtures thereof;
(ii) 1? to 80 parts of a dispersion of pyrogenic or precipitated silica in a silicone oil, generally a polydimethylsiloxane oil; and
(iii) 1 to 20 parts of the polymer of formula (1).

This antifoam is prepared in the following manner:

The silica/polydimethylsiloxane oil dispersion is mixed in the heated state in a molten matrix which is either soluble, or insoluble, or dispersible in water, adding the dispersant which is the polymer of formula (1) according to the invention.

The molten dispersion is then cooled and the resulting solid mass is thereafter ground to produce a powder which flows well.

According to the second application, to which the invention relates more specifically, the polymer of formula (1) is used as a silicone additive in a rinsing composition containing an aqueous dispersion of at least one cationic organic surfactant suitable for textiles and which softens textiles, as described in FR-A-2,318,268, for example, which is generally a quaternary ammonium salt containing two long-chain, generally $C_{12}$-$C_{20}$, alkyl radicals.

At least one polymer of formula (1) is added, depending on the particular case, to the cationic surfactant in the form of an emulsion, a dispersion or an aqueous solution. The weight ratio of the organic surfactant to the polymer (1) ranges from 3:1 to 1:20.

The rinsing bath is then effective at a content of organic surfactant plus polymer of formula (1) of from 15 to 600 ppm, including at least 8 ppm of polymer of formula (1).

In order to further illustrate the present invention and the advantages thereof, the following specific examples are given, it being understood that same are intended only as illustrative and in nowise limitative.

In said examples to follow, as in the above description, all parts and percentages are given by weight, unless otherwise indicated.

EXAMPLE 1

(i) 114.4 parts of a hydrogenopolydimethylsiloxane of average formula $Me_3SiO(Me_2SiO)_{15}(MeHSiO)_3SiMe_3$ (Me=$CH_3$);

(ii) 100 parts of toluene; and (iii) 0.016 part of bis(diethyl sulfide)platinum dichloride were heated to reflux to remove all of the water; and (iv) 5 parts of allylamine were added dropwise over one hour at reflux.

A sample of the reaction mixture was then withdrawn and had a neutralization equivalent of 1,554 and an infrared spectrum demonstrating the presence of an $\equiv$SiH group.

136 parts of the poly(oxyalkylene) of the average formula:

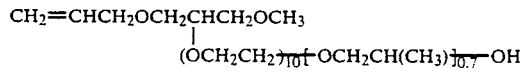

obtained by the reaction of suitable amounts of ethylene oxide and propylene oxide with allyl glycidyl ether in the presence of sodium methanolate, were then added to the reaction mixture.

This addition was carried out under reflux over 50 minutes, and the reaction mixture was heated under reflux for an additional 1 hour, 30 minutes.

The solvent was removed under vacuum at 100° C. and a yellow oil of viscosity 100 mPa.s at 25° C. was thereby obtained. This oil contained no residual $\equiv$SiH groups and had a neutralization equivalent of 3,480. The oil was dispersible in water and had a cloud point of 53° C.

EXAMPLE 2

(i) 142 parts of hydrogenopolydimethylsiloxane of average formula: $MeSiO(Me_2SiO)_{15}(MeHSiO)_3SiMe_3$;

(ii) 100 parts of toluene; and (iii) 0.022 part of bis(diethyl sulfide)platinum dichloride were mixed and heated to reflux; and (iv) 3 parts of allylamine were added dropwise over 30 minutes at reflux.

A sample of the reaction mixture was then withdrawn. After removal of the solvent, this sample had a neutralization equivalent of 2,852.

The IR spectrum demonstrated the presence of residual $\equiv$SiH groups.

195 parts of the polyoxyalkylene used in Example 1 were added at reflux over 5 minutes.

A cloudy solution was obtained, which became clear after refluxing for 2 hours, 30 minutes.

After this period, all the residual ≡SiH groups had disappeared. After removal of the toluene, an oil of viscosity 380 mPa.s at 25° C. was obtained, having a neutralization equivalent of 7,400.

This oil was dispersible in water with a cloud point of 59° C.

EXAMPLE 3

The procedure of Example 1 was repeated exactly, except that the starting mixture comprised:

(i) 144.8 parts of a hydrogenopolydimethylsiloxane oil of average formula: $Me_3SiO(Me_2SiO)_{14}(MeHSiO)_4SiMe_3$;

(ii) 100 parts of toluene;

(iii) 3 parts of allylamine; and (iv) 0.016 part of the same platinum-based catalyst.

The sample withdrawn had a neutralization equivalent of 2,900.

270 parts of the same polyoxyalkylene were added, to finally obtain an oil of viscosity 302 mPa.s at 25° C., a neutralization equivalent of 9,100 and a cloud point of 52° C.

EXAMPLE 4

The procedure of Example 1 was repeated exactly, except that the starting mixture comprised:

(i) 477.8 parts of a hydrogenopolydimethylsiloxane of average formula: $Me_3SiO(Me_2SiO)_{15}(MeHSiO)_{3.1}SiMe_3$;

(ii) 400 parts of toluene;

(iii) 0.0594 part of the same platinum-based catalyst; and (iv) 19.95 parts of allylamine, followed by the addition of:

(v) 577 parts of the same polyoxyalkylene.

The oil obtained had a viscosity of 165 mPa.s at 25° C., a neutralization equivalent of 3,390 and a cloud point of 52° C.

EXAMPLE 5

In a mixer, a dispersion was prepared by mixing:

(i) 95 parts of a trimethylsiloxy-blocked polydimethylsiloxane oil; and (ii) 5 parts of a hydrophobic silica, DEGUSSA SIPERNA ® D10, marketed by DEGUSSA.

40 parts of this dispersion were then mixed in the molten state with 55 parts of polyethylene glycol of molecular weight 6,000 and 5 parts of the silicone oil obtained in Example 1.

The mixture obtained was cooled rapidly by spreading into a thin solid film.

This film was ground to a very fluid, fairly crude powder which flowed well.

The powder consisted of particles of the silicone oil/silica dispersion microencapsulated by a solid matrix of polyethylene glycol, which dispersed readily in an aqueous medium to provide a very good antifoam.

COMPARATIVE EXAMPLE 6

The procedure of Example 5 was repeated exactly, except that the oil of Example 1 was not introduced.

The solid product obtained was sticky and could not be ground into a powder which flowed well.

EXAMPLE 7

The procedure of Example 5 was repeated exactly, except that, in place of polyethylene glycol, the same amount of sorbitan stearate SPAN ® 65, marketed by ICI, was used.

After grinding, a powder which flowed well, dispersing readily in hot water and cold water and forming an efficient antifoam, was obtained.

EXAMPLE 8

The foam height profile of a commercial washing powder for automatic washing machines, not containing an antifoam, was established as a function of time and temperature, using a ZANUSSI ® FL811 front-opening washing machine.

The same profile was established after incorporation of 0.2% of the oil of Example 1. A substantial decrease in the foam level was observed, especially upon completion of the high temperature/high agitation washing cycle.

EXAMPLE 9

162.05 g of a hydrogenopolydimethylsiloxane of the average formula:

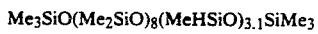

$$Me_3SiO(Me_2SiO)_8(MeHSiO)_{3.1}SiMe_3$$

were dried by refluxing in toluene for 90 minutes. 42 ppm (calculated with respect to the weight of the silicone oil) of the platinum-based catalyst used in Example 1 were added, followed by 9.98 g of allylamine added dropwise over 1 hour.

The reaction mixture was brought to reflux for one additional hour and a sample was withdrawn. This sample, from the which the toluene was removed, required 13.05 ml of N/10 hydrochloric acid for neutralization. 256.4 g of a polyoxyalkylene of the formula:

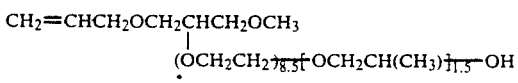

$$CH_2=CHCH_2OCH_2CHCH_2OCH_3$$
$$|$$
$$(OCH_2CH_2)_{\overline{18.5}}(OCH_2CH(CH_3))_{\overline{11.5}}-OH$$

were then reacted at reflux for 30 minutes, the solvent then being removed at reflux for 2 hours. The residual ≡SiH content was 28% with respect to the initial content. Refluxing was continued for an additional 2 hours, resulting in a residual ≡SiH content of 19%. The reaction mixture was cooled to 110° C. and 42 ppm of platinum-based catalyst were added. The mixture was heated and brought to reflux again for 2 hours.

The residual ≡SiH content was 8%.

Refluxing for 3 hours, 30 minutes, removed all of the residual ≡SiH groups.

The reaction mixture was cooled to 80° C.

2 g of bentonite, 2 g of active charcoal and 2 g of water were added while the mixture was stirred for 90 minutes. The latter was filtered on CELITE ® and the solvent was removed under reflux.

An oil having the following characteristics was obtained:

(a) % residual ≡SiH: 0;

(b) amine equivalent: 3,040;

(c) viscosity at 25° C.: 172 mPa.s;

(d) cloud point: 49° C.

(solution cloudy at 15° C., which was completely clear at 25° C.).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polydiorganosiloxane comprising amino and polyoxyalkylene groups and having the average formula (1):

$$R_3SiO(RSiO)_m(RSiO)_n(RSiO)_p(R_2SiO)_qSiR_3 \quad (1)$$

with substituents:
- on $(RSiO)_m$: $(CH_2)_3-X-NH_2$
- on $(RSiO)_n$: $(CH_2)_3-Y+OC_2H_4)_a(OC_3H_6)_bOR'$
- on $(RSiO)_p$: $OR''$ in which the radicals R are $C_1-C_4$ alkyl, phenyl or 3,3,3-trifluoropropyl radicals, at least 80% of the number of the radicals R being methyl radicals; X is a single covalent bond Y is a divalent radical of the formula (3):

$$-O-CH_2-CH(-)-CH_2OCH_3 \quad (3)$$

m is a number ranging from 1 to 25; n is a number ranging from 1 to 25; p is a number ranging from 0 to 15; g is a number ranging from 5 to 500; a is a number ranging from 0 to 150; b is a number ranging from 0 to 150; a+b ranges from 5 to 200; R' is a hydrogen atom, a $C_1-C_6$ alkyl radical, a $C_1-C_6$ acyl radical or a phenyl radical; and R'' is a linear or branched $C_1-C_6$ alkyl radical.

2. The polydiorganosiloxane as defined by claim 1, wherein R and R' are methyl radicals.

3. The polydiorganosiloxane as defined by claim 1, wherein m ranges from 1 to 10; n ranges from 1 to 10; p ranges from 1 to 5; and g ranges from 10 to 400.

4. A process for the preparation of the polydiorganosiloxane as defined by claim 1 comprising partially hydrosilylating a corresponding hydrogenopolydiorganosiloxane with allylamine, next hydrosilylating all or a fraction of the residual ≡SiH groups with a polyoxyalkylene compound of the formula:

$$CH_2=CHCH_2OCH_2CHCH_2OCH_3 \quad (6)$$
$$\quad\quad\quad\quad\quad\quad\quad |$$
$$\quad\quad\quad\quad\quad (OC_2H_4)_a(OC_3H_6)_bOR'$$

and then reacting any residual ≡SiH groups with an alcohol of the formula R''OH.

5. In a process for the surface treatment of textile fibers, the improvement which comprises utilizing as the treatment agent therefore, the polydiorganosiloxane as defined by claim 1.

* * * * *